United States Patent Office 3,618,435
Patented Nov. 9, 1971

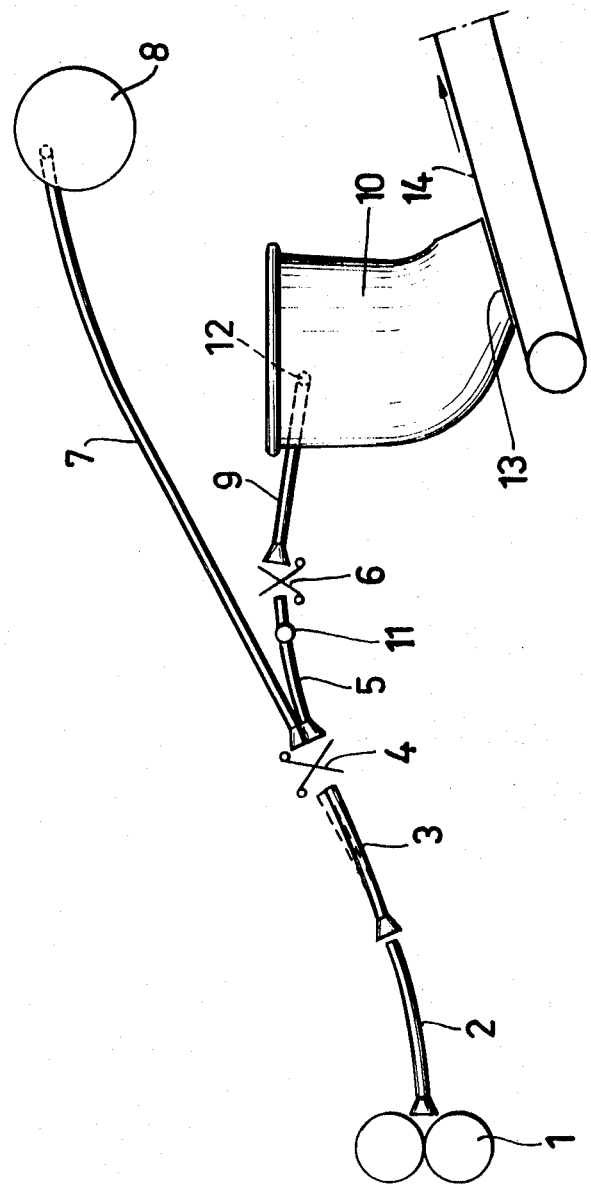

3,618,435
PROCESS AND DEVICE FOR THE RETARDATION OF WIRE CUTTINGS AFTER SAMPLING SHEARS
Karl Sten Olof Forsberg, Smedjebacken, and Hans Erik Gedin, Ludvika, Sweden, assignors to Morgardshammar Aktiebolag, Smedjebacken, Sweden
Filed Apr. 3, 1969, Ser. No. 813,067
Claims priority, application Sweden, Apr. 9, 1968, 4,763/68
Int. Cl. B26d 7/06
U.S. Cl. 83—27
6 Claims

ABSTRACT OF THE DISCLOSURE

This invention relates to a process and a device for the retardation of wire cuttings which move forward at high speed and come from the first and last end cut off from a hot wire rod from a rolling mill, the cut ends being cut off into short pieces in piece cutting shears ("toggle shears"). The pieces are guided tangentially into a cylindrical or slightly conical drum in such a way that the pieces cut off follow a spiral path along the inner jacket surface of drum until retardation has taken place when the pieces fall down to an opening at the bottom of the drum.

---

This invention relates partly to a process for the retardation of wire cuttings moving forward at high speed and coming from the first and last end cut off from a hot wire material from a wire rolling mill, these ends being cut off into short pieces in shears, and partly to a device for carrying out this process.

The wire flowing from a wire rolling mill is usually clean-cut at the first and last end. This cutting operation is carried out in dividing shears in a manner previously known. Usually these cut off ends are selected as samples. For this purpose the ends which may be 5–30 metres long, are guided to piece cutting shears which cut them into short pieces, 0.3–1 metre long in a conventional manner.

Of the short pieces obtained from the piece cutting shears the pieces nearest to the clean-out wire are the most suitable wire samples. It is therefore of interest that one should be able to secure these pieces without their being damaged, e.g. by knocking against some underlay or against each other. It is also of interest to ensure that they do not become greatly disarranged.

It is previously known how to retard cuttings moving at high speed in a pipe by having the pipe bent. If the speed of the wire cuttings is varying they are retarded over a longer or shorter distance in the bent pipe, when they may either be caught in the pipe or emerge from the pipe at such speed that it is impossible to handle the samples; at the same time one risks their being in disorder.

The object of the present invention is to retard the flow of samples coming from the shears and make them fall out in the order in which they have entered without running the risk that some pieces are caught in the retardation device or pass through it without being entirely retarded.

According to the process disclosed by the present invention the above object is achieved by guiding the pieces tangentially into a cylindrical or slightly conical drum in such a way that the pieces follow a spiral path along the inner jacket surface of the drum until retardation has taken place, the pieces then falling down to an opening at the bottom of the drum.

The device according to the present invention is characterized in that a cylindrical or slightly conical drum with a tangential inlet for the short pieces is arranged after the shears, the tangential inlet having such an angle of incidence that the pieces follow a spiral path along the inner jacket surface of the drum, and that the bottom of the drum is provided with an opening through which the pieces fall when they have been retarded.

The retardation takes place owing to the centrifugal force towards the inner jacket surface of the drum and to the frictional drag established between the pieces and the said jacket surface. Irrespective of the inlet speed of the pieces they will be retarded, fall down and out through the opening at the bottom of the drum. By shaping the outlet like a groove and by means of a conveyor belt one gets the pieces out in order from the first or the last end.

The pieces which are to be used for testing may suitably be sprayed with a metal oxide slurry and be dyed in this way in spite of the high temperature. Such a dyeing of the pieces which lie nearest to the clean-cut wire greatly increases the safety if there should all the same be some disorder. If two paint-spraying guns containing different colours are used one may dye the first and last end respectively with different colours. The paint-spraying operation may suitably be controlled by means of a photoelectric cell and time relay in the same conventional manner in which the shears are controlled.

In order further to illustrate the present invention an example is given below as to its application together with a reference to the attached drawing which schematically shows a device for carrying out the process according to the present invention.

In the drawing the hot wire material runs from a finishing rolling mill stand 1 and is guided into guide pipe 2 to a switch pipe 3 before a conventional dividing shears 4. In the shears 4 the wire rod is clean-out, one first and one last end being cut off. The first end proceeds from the switch pipe 3 through the shears 4 and guide pipe 5 to the piece cutting shears 6 ("toggle shears") where the first end is cut into short pieces, for example 0.3–1.0 metre long. When 5–30 metres of the first end have passed through the switch pipe 3 and impulse switches the pipe 3 to a second position and the shears 4 make a clean cut of the wire rod which proceeds through guide pipe 7 to coiler 8.

The cut short pieces from the shears 6 proceed guide pipe 9 into drum 10 with a tangential inlet 12.

When the first end or last end passes paint sprayer 11 mounted in the guide pipe 5, the sprayer 11 receives the impulse to spray when, for instance, half the first end has passed, or, respectively, when the last end of the clean cut wire rod has passed. The inlet has such an angle of incidence, e.g. 5–15°, that the pieces follow a spiral path along the inner jacket surface of drum 11 and, after complete retardation, fall down to and through opening 13 on to conveyor belt 14 for removal and testing. The conveyor belt may be driven at a suitable speed so that the pieces come in due order.

What we claim is:

1. A process for the retardation of wire cuttings which move forward at high speed and come from the first and last end cut off from a hot wire material from a rolling mill, the cut ends being cut off into short pieces in shears, characterized in that the pieces are guided tangentially into a cylindrical or slightly conical drum in such a way that the pieces follow a spiral path along the inner jacket surface of the drum until retardation has taken place, when the pieces fall down to an opening at the bottom of the drum.

2. A process according to claim 1, characterized in that the opening at the bottom of the drum is shaped like a groove.

3. A process according to claim 1, characterized in that the opening at the bottom of the drum ends over a conveyor belt which carries away the pieces in the order in which they have arrived.

4. A wire cuttings retardation device in association with a rolling mill for hot wire which rolling mill includes a rolling mill stand; a coiler; a first shears; a first guide means for guiding a wire from said rolling mill stand to said first shears; a second guide means for guiding a wire from said first shears to said coiler; a piece cutting shears; a switch guide means for guiding wire from said first shears to said piece cutting shears; and supplementary guide means for guiding wire cuttings from said piece cutting shears to a cuttings receiving means, the improvement which comprises a drum-shaped receiving means having a tangential inlet adjacent the top thereof for accommodating said supplementary guide means and having a cuttings discharge opening at the bottom thereof, said drum-shaped receiving means providing along its curved inner surface a spiral path for cuttings discharged into said drum by said supplementary guide means.

5. A device according to claim 4, characterized in that the opening is shaped like a groove.

6. A device according to claim 4, characterized in that a conveyor belt is arranged under the opening.

References Cited
UNITED STATES PATENTS

| | | | |
|---|---|---|---|
| 2,701,016 | 2/1955 | Bedson | 83—105 |
| 2,881,835 | 4/1959 | Morgan | 83—162 |
| 3,109,340 | 11/1963 | Kinnicutt, Jr., et al. | 83—105 |
| 3,258,951 | 7/1966 | Kinnicutt, Jr., et al. | 83—105 X |

WILLIAM S. LAWSON, Primary Examiner

U.S. Cl. X.R.

83—105, 165, 166, 419